United States Patent

Corcoran et al.

[11] Patent Number: 5,740,778
[45] Date of Patent: Apr. 21, 1998

[54] VARIABLE GEOMETRY INTAKE SYSTEM FOR AN INTERNAL COMBUSTION ENGINE

[75] Inventors: William C. Corcoran, Dearborn Heights, Mich.; Darrell C. Drouillard, Windsor, Canada; Edwin J. Matysiewicz, Farmington Hills, Mich.; Randall Berry, Wallingford, Conn.; Vasant B. Patel, Taylor; Stanley F. Zenas, Farmington Hills, both of Mich.

[73] Assignee: Ford Global Technologies, Inc., Dearborn, Mich.

[21] Appl. No.: 620,144

[22] Filed: Mar. 22, 1996

[51] Int. Cl.⁶ ............................................. F02B 31/00
[52] U.S. Cl. ................................................... 123/306
[58] Field of Search ............................. 123/306, 308, 123/184.25, 184.27, 184.38, 184.37, 184.43, 184.45, 184.48, 184.52, 184.53, 417

[56] References Cited

U.S. PATENT DOCUMENTS

| | | | |
|---|---|---|---|
| 4,651,693 | 3/1987 | Nakajima et al. | 123/306 |
| 4,694,794 | 9/1987 | Kato et al. | 123/306 |
| 4,823,753 | 4/1989 | Murakami et al. | 123/306 |
| 4,850,317 | 7/1989 | Katsumoto et al. | 123/306 |
| 4,889,082 | 12/1989 | Hitomi et al. | |
| 4,932,369 | 6/1990 | Parr. | |
| 4,998,518 | 3/1991 | Mitsumoto | 123/306 |
| 5,080,065 | 1/1992 | Nomura et al. | |
| 5,109,811 | 5/1992 | Tanaka et al. | |
| 5,143,038 | 9/1992 | Dahlgren et al. | |
| 5,179,917 | 1/1993 | Hokazono et al. | |
| 5,197,433 | 3/1993 | Dykstra et al. | |
| 5,255,648 | 10/1993 | Hokazono et al. | |
| 5,267,543 | 12/1993 | Novak et al. | 123/306 |
| 5,309,880 | 5/1994 | Mazzella et al. | 123/306 |
| 5,309,883 | 5/1994 | Pischke. | |
| 5,427,078 | 6/1995 | Hitomi et al. | |

FOREIGN PATENT DOCUMENTS

| | | | |
|---|---|---|---|
| 0131316 | 8/1983 | Japan | 123/306 |
| 0197423 | 11/1983 | Japan | 123/306 |
| 0220923 | 12/1983 | Japan | 123/306 |
| 60-22021 | 2/1985 | Japan. | |
| 2276244 | 12/1987 | Japan | 123/306 |
| 3-18622 | 1/1991 | Japan. | |

*Primary Examiner*—Marguerite McMahon
*Attorney, Agent, or Firm*—Jerome R. Drouillard

[57] ABSTRACT

An intake system for a multicylinder internal combustion engine includes a manifold having inlet runners for conducting charge air into the cylinders of an engine, and at least one secondary throttle valve situated within at least one of the inlet runners. An electrically driven motor positions the secondary throttle valve, with the motor being operated by a controller, which senses engine operating parameters including the temperature of an electrically driven motor which powers the secondary throttle valve.

14 Claims, 2 Drawing Sheets

VARIABLE GEOMETRY INTAKE SYSTEM FOR AN INTERNAL COMBUSTION ENGINE

BACKGROUND OF THE INVENTION

1. Field of the Invention

This invention relates to a variable geometry intake system for an internal combustion engine, with the intake system having an electrically driven motor for positioning a secondary throttle valve in one of the inlet runners of the intake system.

2. Disclosure Information

Variable geometry intake systems employing deactivatable ports are desirably used for controlling burn rate by allowing a primary port passage to remain open at all times, while having secondary port passages which may be deactivated. Such deactivation has been accomplished principally by means of vacuum motors such as that shown in U.S. Pat. No. 5,267,543, which is assigned to the assignee of the present invention, and which is hereby incorporated by reference in this specification. The use of vacuum motors to accomplish deactivation of secondary port passages has been proven to have certain deficiencies inasmuch as vacuum motors rely upon atmospheric pressure for their motive force. As a result, at high altitude, the response time of the port deactivation device may be impaired. And, engine tuning which changes the inlet manifold pressure may also cause erratic or at least unanticipated changes in response time of the port deactivation. This, in turn, may cause undesirable drivability characteristics. For example, if the port deactivation devices open too rapidly, a torque bump or spike may be felt by the operator and passengers of the vehicle. In general, it is desirable to make the deactivation as transparent as possible. This will assure that the positive effects of such a system, such as burn rate control and high tolerance for exhaust gas recirculation at low and moderate engine loads, will be achieved while at the same time allowing high power operation with both the primary and secondary runners open.

SUMMARY OF THE INVENTION

An intake system for a multicylinder internal combustion engine includes a manifold having a plurality of inlet runners for conducting charge air into the cylinders of an engine, and at least one secondary throttle valve situated within at least one of the inlet runners. An electrically driven motor positions the secondary throttle valve, with the motor being operated by a controller which comprises a plurality of sensors for sensing a plurality of operating parameters of an engine, and a processor for receiving sensed values of operating parameters and for determining an appropriate position for the secondary throttle valve and an appropriate value for the supply voltage of the motor, with the voltage value being based upon at least the temperature of the motor.

According to another aspect of the present invention, the temperature of the motor which positions the secondary throttle valves may be inferred from a sensed temperature of a liquid coolant circulating through the engine, as well as from a sensed temperature of air being charged into the engine. Alternatively, the temperature of the secondary throttle motor may be determined by a sensor located in proximity to the motor.

The second throttle motor is supplied with a relatively greater voltage in event that the temperature of the motor exceeds a threshold value, whereas a relatively smaller voltage is supplied to the motor in the event that the temperature of the motor is less than the same threshold value. The voltage supplied to the motor when the secondary throttle valve is being driven from a closed position to an open position is increased from an initial value to a final value according to a nonlinear function.

The controller which operates the secondary throttle valve includes a counter for determining the number of successive episodes in which the engine is operated without the secondary throttle valve being moved to an open position. In the event that the number of such episodes is less than a predetermined threshold, the controller will open the secondary throttle according to a first set of criteria. However, in the event that the number of episodes exceeds the same threshold value, the controller will open the secondary throttle according to a second, or modified, set of criteria.

The controller also includes means for determining appropriate spark timing for an engine based at least in part upon the sensed position of the secondary throttle valve.

It is an advantage of the present system that a secondary throttle drive motor will operate seamlessly and allow opening of the secondary throttle without an accompanying torque spike.

It is another advantage of the present invention that an intake system according to this invention will work equally well at all altitudes.

It is yet another advantage of the present invention that an inlet system according to the present invention will operate properly at all ambient and all engine temperatures, while smoothly allowing an increase in torque which is not objectionable to the operator of the vehicle.

Other objects, features, and advantages of the present invention will become apparent to the reader of this specification.

DETAILED DESCRIPTION OF PREFERRED EMBODIMENTS

Figure 1:
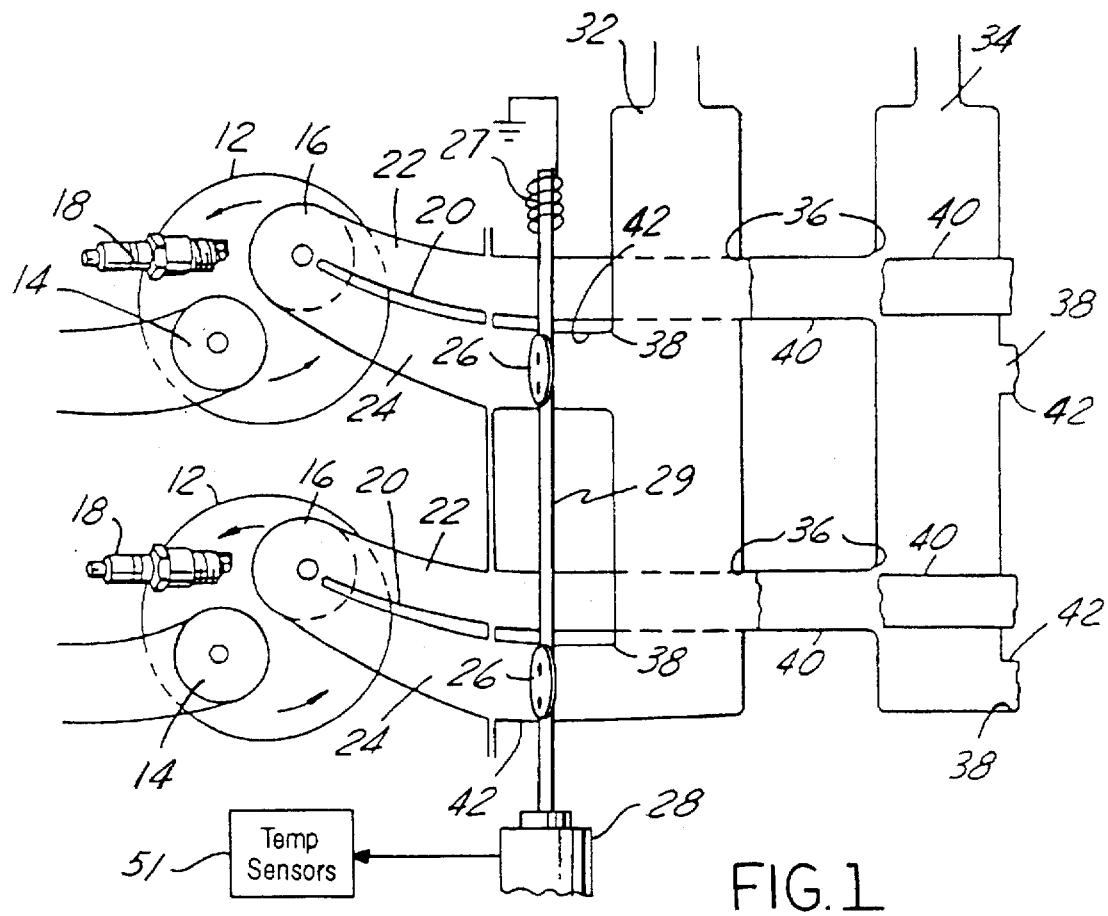
FIG. 1 is a schematic representation of an engine having a system according to the present invention.

As shown in FIG. 1, multicylinder reciprocating internal combustion engine 10 has a plurality of cylinders 12. The cylinders may be arranged either in an in-line configuration, as shown in FIG. 1, or in a V configuration or other configuration known to those skilled in the art and suggested by this disclosure. Engine 10 is equipped with exhaust valves 14 and intake valves 16. Sparkplugs 18 initiate the combustion event. Intake ports of engine 10 comprise primary runners 22 and secondary runners 24, which feed each intake valve 16. The primary and secondary runners are defined in part by vertical dividing wall 20, which separates the runners and which extends entirely from the bottom to the top of the runners. Primary runners 22 are fed by plenum 34, whereas secondary runners 24 are fed by plenum 32. As defined herein, the term "runner" refers to either the illustrated passages extending from a plenum to a cylinder, either directly, or a crossover passage between two plenums, or any of a plurality of passages used in inlet systems of modern internal combustion engines.

Flow of charge through primary runners 22 produces a rotational flow about the outermost portion of each cylinder 12. This rotational flow, sometimes referred to as swirl, is counterclockwise, as viewed in FIG. 1. Flow through secondary runners 24 causes much less swirl within cylinders 12 because fluid flows into a radially inward portion of cylinder 12. The reduced rotational impetus attributable to flow through passages 24 is tolerated because secondary throttle valves 26, which control flow through secondary runners 24, are opened at higher engine speeds which are accompanied by vigorous rotational flow produced by primary runners 22.

Figure 3:
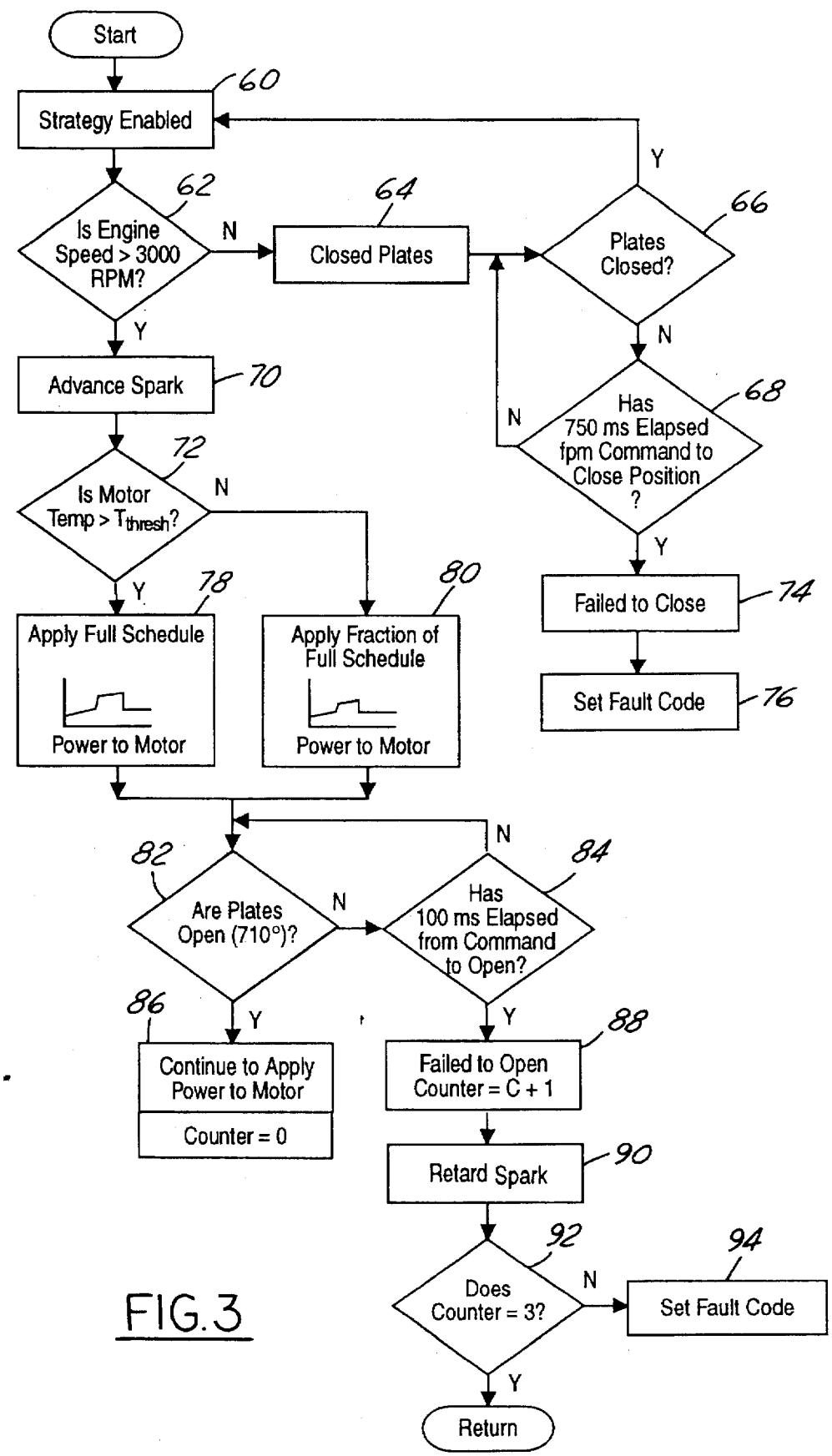
FIG. 3 is a flow chart showing operation of a system according to the present invention.

Secondary throttles 26 are operated by electrically driven motor 28, according to the flow chart shown in FIG. 3. Motor 28 preferably comprises a D.C. motor driving secondary throttles 26 via a shaft 29 and a geartrain (not shown). In a preferred embodiment, motor 28 drives secondary throttles 26 to their fully open position; torsion spring 27 is used to return secondary throttles to their closed position when voltage is not supplied to motor 28.

Figure 2:
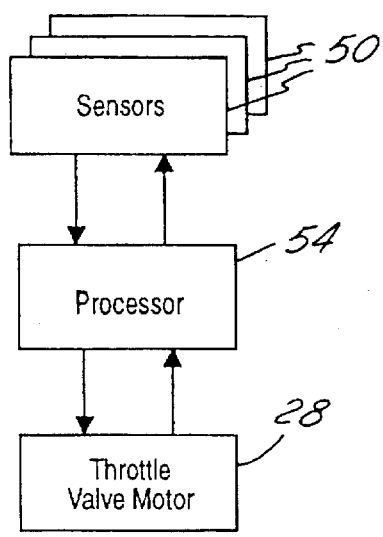
FIG. 2 is a block diagram of a system according to the present invention.

FIG. 2 illustrates components of a control system according to the present invention. A plurality of sensors 50 sense numerous operating parameters of an engine such as engine speed, engine load, driver demand, spark timing, EGR rate, fuel delivery rate, engine charge air temperature, engine coolant temperature, the operating position of secondary throttles, and other parameters known to those skilled in the art and suggested by this disclosure.

Processor 54, which may comprise a conventional engine control microprocessor known to those skilled in the art, or a stand-alone processor, as desired, is charged with the task of operating throttle valve motor 28 so as to open and close secondary throttle valves 26. Processor 54 receives sensed values of engine operating parameters from sensors 22 and determines an appropriate position for secondary throttle valve 26 and an appropriate value for supply voltage from motor 28.

Those skilled in the art undoubtedly recognize that the opening and closing of secondary port throttles must be handled correctly in order to assure that objectionable torque spike or bump is not felt by the drivers and/or passengers of the vehicle. The inventors of the present invention have determined that in order to achieve the desired smoothing of torque output of the engine, it is critical to take into account the temperature of an electrodrive motor system such as that illustrated in the present specification. Accordingly, when motor 28 is at lower temperature values, or values below a threshold level, for that matter, processor 54 supplies motor 28 with a voltage which is relatively lower. Because motor 28 is more efficient at lower temperatures, or at any time wherein the motor itself is at a lower temperature, motor 28 will open secondary throttle valves 26 at too great a rate if full supply voltage is furnished to motor 28. This, in turn, will cause an objectionable torque bump. On the other hand, when motor 28 has achieved a normal operating temperature, i.e., a temperature in excess of a predetermined threshold value, motor 28 may be supplied with a relatively higher supply voltage in order to achieve opening of secondary throttles 26 within a desirable 500–700 millisecond time period.

The temperature of motor 28 may be either sensed directly by a temperature sensor incorporated in the case of the motor as shown by sensor 51 of FIG. 1, or may be inferred from sensed temperature of a liquid coolant circulating through the engine, or from the temperature of the air charge entering the engine, or according to a blended function of the engine coolant temperature and air charge temperature. The inventors of the present invention have determined that the blended function may be used advantageously for this purpose.

During operation of secondary throttle valves 26, motor 28 is supplied with voltage which is increased from an initial value to a final value according to a nonlinear function. This may be done according to a stepwise progression or according to some other function known to those skilled in the art and suggested by this disclosure. At any rate, the voltage supplied to motor 28 is gradually increased in order to provide a controllable opening at a reasonable speed.

Turning now to FIG. 3, operation of the present system begins with enablement of the strategy at block 60. At block 62, if engine speed is above a threshold speed, in this case 3000 rpm, which is a variable that may be selected according to the dictates of the engine being tuned, the spark is advanced at block 70. Then, processor 54 advances to block 72, wherein it determines whether temperature of throttle valve motor 28 is greater than a predetermined threshold level, which may, for example, approximate 70° F. If the temperature of motor 28 is greater than the threshold level, full schedule voltage is applied to motor 28 at block 78. If, however, temperature of motor 28 is less than threshold value, a fraction of the full schedule is applied to motor 28 at block 80. As may be seen in blocks 78 and 80, the voltage schedules in both of these blocks is a nonlinear function. In other words, the supplied voltage ramps up to a first quasi steady state value during the opening period of valves 26; once the valves have opened completely, the voltage is reduced to a level sufficient to hold the valves open against the force of spring 27. This reduction prevents the windings within motor 28 from being harmed by a continuous application of relatively high current.

Continuing now from both blocks 78 and 80, the processor 54 moves to block 82, wherein it determines whether plates 26 are open. The opening or closing position of the plates may be determined by a variety of methods and structures known to those skilled in the art and suggested by this disclosure. For example, a rotary potentiometer, such as used in throttle positioning in electronically controlled internal combustion engines, may be employed. In the present case, the inventors employ a Hall Effect sensor mounted within the case of motor 28. The Hall sensor merely indicates whether the plates are opened in excess of 10 rotational degrees, as shown in block 82. The selection of the type of device used to indicate whether throttle plates 26 are open or closed is beyond the scope of this invention.

If plates 26 are open at block 82, the strategy dictates that processor 54 move to block 86, wherein power is continued to be applied to motor 28 and a counter is set to zero. If, however, at block 82 the plates are not open, the processor 54 moves to block 84, where it is determined whether 100 milliseconds have elapsed from the receipt of the open command. If the answer is no, the strategy returns to block 82 and continues. If, however, the answer to the question at block 84 is yes, the strategy in processor 54 continues to block 88, wherein the fail to open counter is equal to C+1. Having determined that the plates have failed to open, it may be necessary to retard the spark at block 90, because in certain engines, particularly the engine that this present system was applied to by the inventors, a spark knock condition may be encountered with advanced timing. Therefore, the spark timing is altered in the event that secondary throttle valve 26 is not operating properly. In similar fashion, the exhaust gas recirculation rate may be altered so that the engine receives more or less recirculated exhaust gas in the event that the secondary throttle valve 26 is not operating properly. For example, with some engines, it is possible to employ a greater rate of exhaust gas recirculation in the event that the engine is operating at a higher swirl level, as with the secondary throttles 26 closed. However, once throttle valves 26 move to their open position, it may be necessary to reduce the amount of recirculated exhaust to avoid knocking.

If, when processor 54 checks the value of the counter at block 92, and if the value equals 3, a fault code is set at block 94. If the value of the counter is not equal to 3, strategy continues back to block 60. Upon reaching block 60 note that at block 62, if the answer is no, in other words, if the engine speed is less than the predetermined tuning variable, strategy in processor 54 will order secondary throttle plates 26 closed at block 64. At block 66, processor 54 checks to see whether plates are closed. If they are indeed closed, strategy returns to block 60. If the plates are not closed, the processor 54 determines whether 750 milliseconds have elapsed from receipt of the command to the closed position. If not, strategy cycles back to block 66. If, however, at least 750 milliseconds have elapsed, and plates 26 are not closed, the strategy continues to block 74 wherein it is determined that plates 26 have failed to close and a fault code will be entered at block 76.

In addition to determining an appropriate position for secondary throttle valves 26, an appropriate value for supply voltage for motor 28, and an appropriate value for spark timing of the engine, processor 54 has an additional routine which helps to assure that secondary throttle plates 26 will not become immobilized due to failure of the vehicle operator to operate the engine above a threshold speed for a prolonged number of operational periods. Thus, processor 54 contains at least one additional counter which records the number of successive episodes in which the engine is operated without secondary throttles 26 being moved to their open position, such that in the event that the number of such episodes is less than a predetermined threshold, the controller will open secondary throttle plates 26 according to the criteria set forth in FIG. 3.

If the number of successive episodes in which engine speed is kept continuously below 3000 rpm, or another suitable engine speed, with the result that secondary throttle valves 26 have not been moved to the open position, exceeds a threshold amount, which, for example, could comprise 40 such episodes, processor 54 will open secondary throttle valve 26 according to a second set of criteria. These criteria may be chosen so as to minimize the change in torque output of the engine. This may be accomplished, for example, by opening secondary throttle plates 26 during closed throttle operation of the engine, such as when the vehicle is decelerating at closed throttle. In effect, secondary throttles 26 are exercised so as to prevent sticking and to therefore improve the operational readiness of a system according to the present invention. For the purposes of this specification, the term "episode of engine operation" means any period in which the engine is started, run, and then shut off.

While the best mode for carrying out the invention has been described in detail, those familiar with the arts to which this invention relates will recognize alternative designs and embodiments for practicing the invention. For example, any one of a variety of electrically driven motors, such as torque motors, induction motors, or other types of motors could be employed with a system according to the present invention. Thus, the above-described preferred embodiment is intended to be illustrative of the invention, which may be modified within the scope of the following claims.

What is claimed is:

1. An intake system for a multicylinder internal combustion engine, comprising:

a manifold having a plurality of inlet runners for conducting charge air into the cylinders of an engine;

at least one secondary throttle valve situated within at least one of said inlet runners;

an electrically driven motor for positioning said secondary throttle valve; and a controller for operating said motor so as to open and close said secondary throttle valve, with said controller comprising:

a plurality of sensors for sensing a plurality of operating parameters of an engine; and a processor for receiving the sensed values of said operating parameters and for determining an appropriate position for said secondary throttle valve and an appropriate value for the supply voltage for said motor, with the said voltage value being based upon at least the temperature of said motor.

2. An intake system according to claim 1, wherein the temperature of said motor is inferred from a sensed temperature of a liquid coolant circulating through the engine.

3. An intake system according to claim 1, wherein the temperature of said motor is inferred from a sensed temperature of air being charged into the engine.

4. An intake system according to claim 1, wherein the temperature of said motor is determined by a sensor located in proximity to the motor.

5. An intake system according to claim 1, wherein said motor is supplied with a relatively greater voltage in the event that the temperature of the motor exceeds a threshold value, and a relatively smaller voltage in the event that the temperature of the motor is less than a threshold value.

6. An intake system according to claim 5, wherein the voltage supplied to the motor when the secondary throttle valve is being driven from a closed position to an open position is increased from an initial value to a final value according to a nonlinear function.

7. An intake system according to claim 1, wherein said controller further comprises a counter for determining the number of successive episodes in which the engine is operated without said secondary throttle valve being moved to an open position, such that in the event that the number of said episodes is less than a predetermined threshold, said controller will open the secondary throttle according to a first set of criteria, whereas in the further event that the number of episodes exceeds said threshold, the controller will open the secondary throttle according to a second set of criteria.

8. An intake system according to claim 1, wherein said controller further comprises means for determining an appropriate spark timing for an engine, based at least in part upon a sensed position of said secondary throttle valve.

9. An intake system according to claim 1, wherein said controller further comprises means for determining an appropriate exhaust gas recirculation rate for an engine, based at least in part upon a sensed position of said secondary throttle valve.

10. An intake system according to claim 1, wherein said secondary throttle valve is mounted within a divided intake port having flow controlled by a single intake valve.

11. An intake system for a multicylinder internal combustion engine, comprising:

a manifold having a plurality of inlet runners for conducting charge air into the cylinders of an engine;

at least one secondary throttle valve situated within at least one of said inlet runners;

an electrically driven motor for positioning said secondary throttle valve; and a controller for determining appropriate values for various operating parameters of an engine and for operating said motor so as to open and close said secondary throttle valve, with said controller comprising:

a plurality of sensors for sensing a plurality of operating parameters of an engine, including the operational position of the secondary throttle valve; and a processor for receiving the sensed values of said operating parameters and for determining an appropriate position for said secondary throttle valve and an accompanying value for spark timing of the engine.

12. An intake system according to claim 11, wherein said controller further comprises a logic device for verifying proper operation of the secondary throttle valve and for altering the spark timing in the event that the secondary throttle valve is not operating properly.

13. An intake system according to claim 11, wherein said secondary throttle valve is mounted within a divided intake port having flow controlled by a single intake valve.

14. An intake system for a multicylinder spark ignited internal combustion engine, comprising:

a manifold having a primary inlet runner and a secondary inlet runner for conducting charge air into each cylinder of an engine;

a single intake valve for controlling the flow from the primary and secondary inlet runners of each cylinder;

a plurality of secondary throttle valves, with one of said secondary throttle valves being situated within each of said secondary inlet runners;

an electrically driven motor for positioning said secondary throttle valves; and a controller for operating said electrically driven motor so as to open and close said secondary throttle valves, with said controller comprising:

a plurality of sensors for sensing a plurality of operating parameters of an engine; and a processor for receiving the sensed values of said operating parameters and for determining:

an appropriate position for said secondary throttle valve;

an appropriate value for the supply voltage for said motor, with said voltage value being based upon at least the temperature of said electrically driven motor; and an appropriate value for the spark timing of the engine.

* * * * *